United States Patent [19]

Yamakita et al.

[11] Patent Number: 5,053,293

[45] Date of Patent: Oct. 1, 1991

[54] METHOD FOR PRODUCTION OF PHOTOELECTROCHEMICAL CELL AND CELL PRODUCED THEREBY

[75] Inventors: Hiromi Yamakita, Owari-Asahi; Masato Tazawa, Meito; Kiyoshi Hayakawa, Gifu; Hiroshi Taoda, Nagoya, all of Japan

[73] Assignees: Agency of Industrial Science & Technology; Ministry of International Trade & Industry, both of Tokyo, Japan

[21] Appl. No.: 568,714

[22] Filed: Aug. 17, 1990

[30] Foreign Application Priority Data

Aug. 23, 1989 [JP] Japan .................................. 1-216665

[51] Int. Cl.$^5$ ............................................. H01M 6/30
[52] U.S. Cl. ........................................ 429/111; 427/74
[58] Field of Search ................ 429/111; 204/2.1, 58.5, 204/59 R; 427/74

[56] References Cited

U.S. PATENT DOCUMENTS 4,476,003 10/1984 Frank et al. ..................... 204/290 R
4,647,348 3/1987 Yamakita et al. .................. 204/59 R

OTHER PUBLICATIONS

D. Giningue et al., *J. Electrochem. Soc.*, vol. 135, Jul. 1988, pp. 1695–1699.

T. Skotheim et al., *J. Electrochem. Soc.*, vol. 129, Apr. 1982, pp. 894–895.

S. Glemis et al., *Thin Solid Films*, vol. 122, Dec. 1984, pp. 9–17.

G. Horowitz et al., *J. Electrochem. Soc.*, vol. 131, Jan. 1984, pp. 151–156.

G. Horowitz et al., *J. Electrochem. Soc.*, vol. 132, Mar. 1985, pp. 634–637.

*Primary Examiner*—Aaron Weisstuch
*Attorney, Agent, or Firm*—Oblon, Spivak, McClelland, Maier & Neustadt

[57] ABSTRACT

A method for the production of a photoelectrochemical cell includes forming an anion-doped long-chain alkylthiophene polymer layer on one surface of a semiconductor directly or through the medium of a coating of a noble metal formed in advance on said one surface, interposing a solid electrolyte between a transparent electrode and the anion-dope long-chain alkylthiophene polymer on the semiconductor, and finally connecting a lead wire to the other surface of the semiconductor. A photoelectrochemical cell is produced by the method described above and consists essentially of a layer of an anion-doped long-chain alkylthiophene polymer formed on one surface of a semiconductor directly or through the medium of a coating of a noble metal formed in advance, a transparent electrode, and a solid electrolyte interposed between the polymer layer and the transparent electrode.

22 Claims, No Drawings

METHOD FOR PRODUCTION OF PHOTOELECTROCHEMICAL CELL AND CELL PRODUCED THEREBY

BACKGROUND OF THE INVENTION

1. Field of the Invention

This invention relates to a method for the production of a photoelectrochemical cell for converting light energy into electric energy and to a photoelectrochemical cell produced by the method.

2. Prior Art Statement

The wet type photoelectrochemical cell using a semiconductor electrode has been attracting attention as a cell of the type for converting light energy into electric energy.

First, the construction of the conventional wet type photoelectrochemical cell (hereinafter referred to briefly as "photo cell") will be described.

This wet type photo cell comprises a cell housing, an aqueous electrolyte solution placed in the cell housing, and a semiconductor electrode and a counter electrode of platinum opposed to each other and immersed in the aqueous electrolyte solution and produces electric energy by exposing the surface of a semiconductor to the light introduced through a transparent window formed in the cell housing.

Since the semiconductor electrode is immersed in the aqueous electrolyte solution, this wet type photo cell has the disadvantage that the semiconductor is deteriorated by oxidation and dissolved in the aqueous electrolyte solution, frequently to the extent of shortening the service life of the electrode rapidly degrading the quality of the electrode. As a solution of this problem, there has been proposed a photo cell using a solid electrolyte in place of the aqueous electrolyte solution [as proposed by T. Skotheim, I. Lundstrom, *J. Electrochem. Soc.*, 129, 894 (1982), for example]. Unfortunately, this photo cell is deficient in stability. A photo cell using a semiconductor electrode coated with a thin film of platinum and a thin film of polypyrrole produced by the photoelectrolytic polymerization method [reported in the same literature as described above] has been under experiment. This photo cell is still deficient in stability. The surface of the semiconductor is susceptible to deterioration because the thin polymer film is formed by the photoelectrolytic polymerization method. As a result, the photo cell is inferior in quality and incapable of providing stable use for a long time. Moreover, the production of this photo cell requires an immense amount of labor.

Under the circumstances, there has been expressed an earnest desire to develop a photo cell which provides stable use for a long time without a lowering its performance and which is easy to manufacture.

SUMMARY OF THE INVENTION

The present inventors have conducted a study with a view to satisfy the desire mentioned above. They have perfected this invention as the result.

Specifically, this invention is directed to a method for the production of a photoelectrochemical cell, which comprises forming a layer of an anion-doped long-chain alkylthiophene polymer either directly or through the medium of a coating of a noble metal formed in advance on one surface of a semiconductor, interposing a solid electrolyte between an electroconductive surface of a transparent electrode having electroconductive surface and the layer of the anion-doped long-chain alkylthiophene polymer in such a manner that the solid electrolyte contacts the electroconductive surface of the electrode and the layer of the anion-doped long-chain alkylthiophene polymer, and connecting a lead wire to the surface of the semiconductor opposite to the surface on which either the layer of the anion-doped long-chain alkylthiophene polymer or the noble metal coating is formed. The invention also is directed to a photoelectrochemical cell of a novel construction, produced by the method described above and, therefore, consisting essentially of a semiconductor having an anion-doped long-chain alkylthiophene polymer layer formed on one surface thereof either directly or through the medium of a coating of a noble metal formed in advance, a transparent electrode having an electroconductive surface, a solid electrolyte interposed between the anion-doped long-chain alkylthiophene polymer layer and the electroconductive surface of the electrode, and a lead wire connected to the opposite surface of the semiconductor.

DETAILED DESCRIPTION OF THE PREFERRED EMBODIMENTS

In the method of the present invention described above, the formation of the anion-doped long-chain alkylthiophene polymer on one surface of the semiconductor is accomplished very easily by first covering one surface (optionally having a coating of a noble metal formed in advance thereon) of the semiconductor with a solution of the anion-doped long-chain alkylthiophene polymer in a solvent and then evaporating the solvent from the applied layer of the solution.

The semiconductor to be used in the present invention is a single-crystal, polycrystal or amorphous material. The semiconductors effectively usable herein include silicon, gallium phosphide, gallium arsenide, indium phosphide, cadmium telluride, zinc oxide, cadmium sulfide, cadmium selenide, molybdenum sulfide, and molybdenum selenide which are given semiconductivity by doping with various elements, for example. Among the semiconductors mentioned above, silicon, gallium phosphide and indium phosphide are particularly desirable for practical use.

The noble metals which are usable herein for the purpose of coating the one surface of the semiconductor in the form of a thin film include gold, silver, platinum, palladium, ruthenium, osmium, rhodium, and iridium, for example. The methods which are usable herein for the formation of the coating include a method which comprises heating a given noble metal in a vacuum and depositing the vapor of the noble metal on the surface of the semiconductor and a method which comprises electrochemically treating semiconductor in an aqueous solution of a salt containing a given noble metal thereby coating the surface of the semiconductor with a thin film of the noble metal, for example. Among the noble metals mentioned above, gold, silver, and platinum are particularly desirable form a practical point of view.

The long-chain alkylthiophene polymer to be used in the present invention is a product obtained by subjecting a thiophene compound possessing an alkyl substituent of at least 6 carbon atoms to electrolytic polymerization or chemical polymerization. Unlike the thiophene polymer heretofore used in the prior art, it is soluble in a solvent. The thiophene compounds possessing an alkyl substituent of at least 6 carbon atoms include thiophenes with such alkyl substituents as 3-hexyl, 3-octyl, 3-dodecyl, 3-octadecyl, 3-eicosyl, and 3-methyl-4- hexyl, 3,4-dihexyl, for example. The largest number of carbon atoms of the alkyl substituents allowable from a practical point of view is 18. Preferably, the number of carbon atoms of the substituent is in the range of 6 to 12.

The production of the anion-doped long-chain alkylthiophene polymer is accomplished by carrying out the aforementioned electrolytic polymerization of a thiophene compound in a solvent in the presence of a supporting electrolyte selected from the group consisting of tetrabutyl ammonium trifluoromethanesulfonate, tetrabutyl ammonium hexafluorophosphate, tetraethyl ammonium hexafluorophosphate and tetrabutyl ammonium tetrafluoroborate. By this polymerization is produced a polymer doped with trifluoromethanesulfonate ion, hexafluorophosphoric acid ion or tetrafluoroboric acid ion, depending on the kind of the supporting electrolyte to be used.

The electrolytes which prove to be particularly desirable from a practical point of view are tetrabutyl ammonium trifluoromethanesulfonate and tetrabutyl ammonium hexafluorophosphate. The amount of the dopant which the polymer is required to incorporate therein is approximately in the range of 3 to 25 mol % per monomer unit of the polymer.

The solvents which are used for the preparation of a solution of the anion-doped long-chain alkylthiophene polymer include halogenides such as chloroform, methylene chloride, trichloroethane and bromoform, and hydrocarbon compounds such as tetrahydronaphthalene, benzene, toluene and xylene, for example.

The solid electrolytes which are effectively usable herein include those obtained by dissolving such alkali metal salts as lithium perchlorate, lithium isothiocyanate, lithium iodide, sodium iodide, sodium iodide-iodine and mixtures thereof in polyether compounds such as polyethylene oxide and polypropylene oxide, cross-linked derivatives thereof, polyimine compounds such as polyethylene imine, polyester compounds such as polyethylene succinate and polyethylene sebacate, and polysulfide compounds such as polyalkylene sulfides, for example.

The solid electrolyte which proves to be particularly desirable from a practical point of view comprises polyethylene oxide of an average molecular weight in the range of 1,000 to 20,000, 10 to 14.5% by weight, based on the amount of the polyethylene oxide, of iodine, and 10 to 87% by weight, based on the amount of the polyethylene oxide, of sodium iodide.

The transparent electrode has no particular restriction except that it should exhibit transparency and possess an electroconductive surface. An electrode made of glass and coated with tin oxide or indium-tin oxide, for example, may be cited as one good example.

By the method of the present invention, there is obtained novel photoelectrochemical cell which has a solid electrolyte sandwiched between an anion-doped long-chain alkylthiophene polymer layer and a transparent electrode.

In the cell of the present invention, the thickness of the semiconductor is desired from the practical point of view to be in the range of 0.01 to 5 mm, that of the transparent electrode in the range of 0.1 to 5 mm, that of the anion-doped long-chain alkylthiophene polymer in the range of 0.005 to 0.5 $\mu$m, that of the solid electrolyte in the range of 0.01 to 0.3 mm, and that of the film of a noble metal optionally formed on the semiconductor or in the range of 10 to 80 Å.

The photoelectrochemical cell of this invention which is produced by the method of the present invention continues to exhibit stable quality for a long time owing to the protective effect manifested by the thin film of an electroconductive polymer. The deposition of the thin film of the electroconductive polymer involved in the method of this invention can be attained by a very simple procedure. Further, since the deposition of this thin film can be attained without entailing any deterioration of the semiconductor surface by oxidation, the produced photoelectrochemical cell enjoys a stable and highly satisfactory quality.

Examples:

Now, the present invention will be described more specifically below with reference to typical working examples.

EXAMPLE 1

An n-type single-crystal silicon semiconductor (doped with phosphorus in a thickness of 0.5 mm) etched in advance with hydrofluoric acid for 15 seconds was placed in a vacuum-evaporation device, wherein one surface of the silicon semiconductor was exposed for 20 seconds to vacuum deposition effected by red hot heating of a piece of gold held at a distance of 7 cm from the surface under a vacuum in the range of $10^{-4}$ to $10^{-5}$ mmHg. As a result, there was formed a vacuum-deposited film of gold about 50 Å in thickness.

Separately, a solution, in 1 ml of chloroform, of 0.85 mg of 3-dodecyl thiophene polymer doped in advance with trifluoromethanesulfonate ion (about 10 mol% per monomer unit) was prepared. A small amount of the soluble portion of the solution was dropped onto the surface of the silicon semiconductor coated with the thin film of gold as described above until the surface was completely covered with the solution. The solvent was expelled by evaporation from the layer of the solution deposited on the surface of the semiconductor to give rise to a film of 3-dodecyl thiophene polymer about several hundred Å in thickness.

Separately, 100 mg of polyethylene oxide (average molecular weight 8,000), 86.9 mg of sodium iodide, and 145 mg of iodine were dissolved in 0.91 ml of acetonitrile. A small amount of the solution was dropped onto the electroconductive surface of a glass coated with indium-tin oxide (1 mm in thickness) and was dried to form a film of a solid electrolyte about 80 microns in thickness. On this solid electrolyte film, the surface of the thin polymer film on the coated semiconductor was joined fast with pressure. On the rear surface of the semiconductor, a gallium-indium alloy was applied (0.1 to 0.3 mm in thickness) and a lead wire was connected to the alloy coating.

EXAMPLE 2

The surface of an n-type single-crystal silicon semiconductor etched in advance with hydrofluoric acid for 15 seconds was covered with a small amount of the soluble portion of a chloroform solution of a 3-dodecylthiophene polymer doped in advance with trifluoromethane-sulfonate ion in the same manner as in Example 1. The solvent was expelled by evaporation from the applied layer of the solution to form a film of the polymer on the surface of the semiconductor. Separately, a film of a polyethylene oxide-sodium iodide-iodine type solid electrolyte was formed on a glass coated with indium-tin oxide in the same manner as in Example 1. On this electrolyte film, the surface of the thin polymer film on the semiconductor was adhered with pressure. On the rear surface of the semiconductor, a gallium-indium alloy was applied and a cable was connected to the alloy coating.

REFERENTIAL EXAMPLE 1

When the photoelectrochemical cell obtained in Example 1 was irradiated with the light from a halogen lamp of 800 W at an intensity of 79 mW/cm$^2$, the short-circuit photoelectric current was 0.164 mA/cm$^2$ and the open circuit voltage was 271 mV. The damping ratio of the photoelectric current was 3.9% after 18 minutes following the start of the irradiation. In the case of a photoelectrochemical cell assembled with a silicon semiconductor coated with a thin film of gold, the short-circuit photoelectric current was 0.018 mA/cm$^2$ and the damping ratio of the photoelectric current was 26.5% after 18 minutes following the start of the irradiation.

REFERENTIAL EXAMPLE 2

When the photoelectrical cell obtained in Example 2 was irradiated with the light from a halogen lamp of 300 W at an intensity of 79 mW/cm$^2$, the short-circuit photoelectric current was 0.017 mA/cm$^2$ and the open circuit voltage was 284 mV. The photoelectric current showed an increase of about 4% during the period of 10 to 50 minutes following the start of the irradiation. In the case of a photoelectrochemical cell assembled with a silicon semiconductor having no coating, the short-circuit photoelectric current was less than 0.001 mA/cm$^2$ at the start of the irradiation.

The photoelectrochemical cell of the present invention can be produced by a simple method and enjoys stable and highly satisfactory quality and endures a protracted use. This photoelectrochemical cell can be utilized for efficiently harnessing the solar energy in the form of electric energy.

What is claimed is:

1. A method for the production of a photoelectrochemical cell, which comprises forming on one surface of a semiconductor a layer of an anion-doped long-chain alkylthiophene polymer, interposing a solid electrolyte between an electroconductive surface of a transparent electrode and the layer of said anion-doped long-chain alkylthiophene polymer on said semiconductor in such a manner that said interposed solid electrolyte contacts said electroconductive surface and said polymer layer, and connecting a lead wire to the other surface of said semiconductor opposite to said anion-doped long-chain alkylthiophene polymer.

2. A method according to claim 1, wherein a film of a noble metal is formed in advance on said one surface of said semiconductor.

3. A method according to claim 2, wherein said noble metal is at least one member selected from the group consisting of gold, silver, platinum, palladium, ruthenium, osmium, rhodium, and iridium.

4. A method according to claim 2, wherein the thickness of said coating of a noble metal is in the range of 10 to 80 Å.

5. A method according to claim 1, wherein said layer of said anion-doped long-chain alkylthiophene polymer is formed on one surface of said semiconductor by coating said one surface of said semiconductor with a solution of said anion-doped long-chain alkylthiophene polymer in a solvent and then evaporating said solvent from the coating layer of said solution.

6. A method according to claim 1, wherein said layer of said anion-doped long-chain alkylthiophene polymer is obtained by subjecting to electrolytic polymerization a thiophene compound possessing an alkyl substituent of at least 6 carbon atoms in the presence of at least one member selected from the group consisting of tetrabutyl ammonium trifluoromethanesulfonate, tetrabutyl ammonium hexafluorophosphate, tetraethyl ammonium hexafluorophosphate, and tetrabutyl ammonium tetrafluoroborate as a supporting electrolyte.

7. A method according to claim 6, wherein the alkyl substituent of at least 6 carbon atoms in said thiophene compound is one member selected from the group consisting of 3-hexyl, 3-octyl, 3-dodecyl, 3-octadecyl, 3-eicosyl, 3-methyl-4-hexyl, and 3,4-dihexyl.

8. A method according to claim 1, wherein the amount of an anion used in doping said anion-doped long-chain alkylthiophene polymer is in the range of 3 to 25 mol% per monomer unit of a long-chain alkylthiophene polymer.

9. A method according to claim 1, wherein said solid electrolyte is an electrolyte having one member selected from the group consisting of lithium perchlorate, lithium isothiocyanate, lithium iodide, sodium iodide, and sodium-iodine iodide dissolved in one member selected from the group consisting of polyethylene oxide, polypropylene oxide, cross-linked derivatives of said oxides, polyethylene imine, polyethylene succinate, polyethylene sebacate, and polyalkylene sulfides.

10. A method according to claim 1, wherein said transparent electrode is one member selected from the group consisting of glass coated with tin oxide and glass coated with indium-tin oxide.

11. A method according to claim 1, wherein the thickness of said semiconductor is in the range of 0.01 to 5 mm, that of said transparent electrode in the range of 0.1 to 5 mm, that of said solid electrolyte in the range of 0.01 to 0.3 mm, and that of said anion-doped long-chain alkylthiophene polymer layer in the range of 0.005 to 0.5 μm.

12. A photoelectrochemical cell, consisting essentially of a semiconductor having a layer of an anion-doped long-chain alkylthiophene polymer formed on one surface thereof, a transparent electrode having an electroconductive surface, a solid electrolyte interposed between said anion-doped long-chain alkylthiophene polymer layer on said semiconductor and said electroconductive surface of said electrode, and a lead wire connected to the other surface of said semiconductor.

13. A photoelectrochemical cell according to claim 12, further consisting of a coating of a noble metal formed in advance between said one surface of said semiconductor and said polymer layer.

14. A photoelectrochemical cell according to claim 13, wherein said noble metal is at least one member selected from the group consisting of gold, silver, platinum, palladium, ruthenium, osmium, rhodium, and iridium.

15. A photoelectrochemical cell according to claim 13, wherein the thickness of said coating of a noble metal is in the range of 10 to 80 Å.

16. A photoelectrochemical cell according to claim 12, wherein said anion-doped long-chain alkylthiophene polymer is a polymer of a thiophene compound possessing an alkyl substituent of at least 6 carbon atoms.

17. A photoelectrochemical cell according to claim 16, wherein said anion is one member selected from the group consisting of trifluoromethanesulfonate ion, hexafluorophosphate ion, and tetrafluorophosphorate ion.

18. A photoelectrochemical cell according to claim 17, wherein the amount of said anion used in doping said anion-doped long-chain alkylthiophene polymer is in the range of 3 to 25 mol% per monomer unit of a long-chain alkylthiophene polymer.

19. A photoelectrochemical cell according to claim 16, wherein the alkyl substituent of at least 6 carbon atoms in said thiophene compound is at least one member selected from the group consisting of 3-hexyl, 3-octyl, 3-dodecyl, 3-octadecyl, 3-eicosyl, 3-methyl-4-hexyl, and 3,4-dihexyl.

20. A photoelectrochemical cell according to claim 12, wherein said solid electrolyte is an electrolyte having one member selected from the group consisting of lithium perchlorate, lithium isothiocyanate, lithium iodide, sodium iodide, and sodium-iodine iodide dissolved in one member selected from the group consisting of polyethylene oxide, polypropylene oxide, cross-linked derivatives of said oxides, polyethylene imine, polyethylene succinate, polyethylene sebacate, and polyalkylene sulfides.

21. A photoelectrochemical cell according to claim 12, wherein said transparent electrode is one member selected from the group consisting of glass coated with tin oxide and glass coated with indium-tin oxide.

22. A photoelectrochemical cell according to claim 12, wherein the thickness of said semiconductor is in the range of 0.01 to 5 mm, that of said transparent electrode in the range of 0.1 to 5 mm, that of said solid electrolyte in the range of 0.01 to 0.3 mm, and that of said anion-doped long-chain alkylthiophene polymer layer in the range of 0.005 to 0.5 μm.

* * * * *